United States Patent [19]

Kaufhold

[11] 4,412,171
[45] Oct. 25, 1983

[54] CIRCUIT ARRANGEMENT FOR DAMPING POWER OSCILLATIONS OF SYNCHRONOUS GENERATORS IN NETWORKS

[75] Inventor: Wolfgang Kaufhold, Erlangen-Tennenlohe, Fed. Rep. of Germany

[73] Assignee: Siemens Aktiengesellschaft, Munich, Fed. Rep. of Germany

[21] Appl. No.: 282,149

[22] Filed: Jul. 10, 1981

[30] Foreign Application Priority Data

Jul. 11, 1980 [DE] Fed. Rep. of Germany ....... 3026360

[51] Int. Cl.³ .............................................. H02P 9/10
[52] U.S. Cl. ...................................... 322/20; 322/24; 322/32; 322/58; 361/20
[58] Field of Search ...................... 322/58, 17, 19, 25, 322/28, 24, 29, 20, 32; 361/20

[56] References Cited

U.S. PATENT DOCUMENTS

| | | | |
|---|---|---|---|
| 3,465,235 | 9/1969 | Schleif et al. | 322/24 |
| 3,477,014 | 11/1969 | Blythe | 322/24 X |
| 4,080,559 | 3/1978 | Wright et al. | 322/58 |
| 4,329,637 | 5/1982 | Kotake et al. | 322/58 X |
| 4,377,780 | 3/1983 | Bjorklund | 322/58 X |

Primary Examiner—R. J. Hickey
Attorney, Agent, or Firm—Kenyon & Kenyon

[57] ABSTRACT

The input signal corresponding to the respective frequency or power variation is supplied both to the inputs of the discrete filters and to angle measuring devices assigned to them, of which only the tuned filter in conjunction with its angle measuring device actuates a switch which sends the filter output via angle rotating and matching elements to a MAX selector element, from which the supplementary damping signal for the excitation is tapped. For low oscillation frequencies a low-press filter is provided which, via mean value formers and time delay multivibrator stages, permits a regulator signal to become operative for the excitation, delayed or undelayed, when certain limit values are exceeded.

2 Claims, 1 Drawing Figure

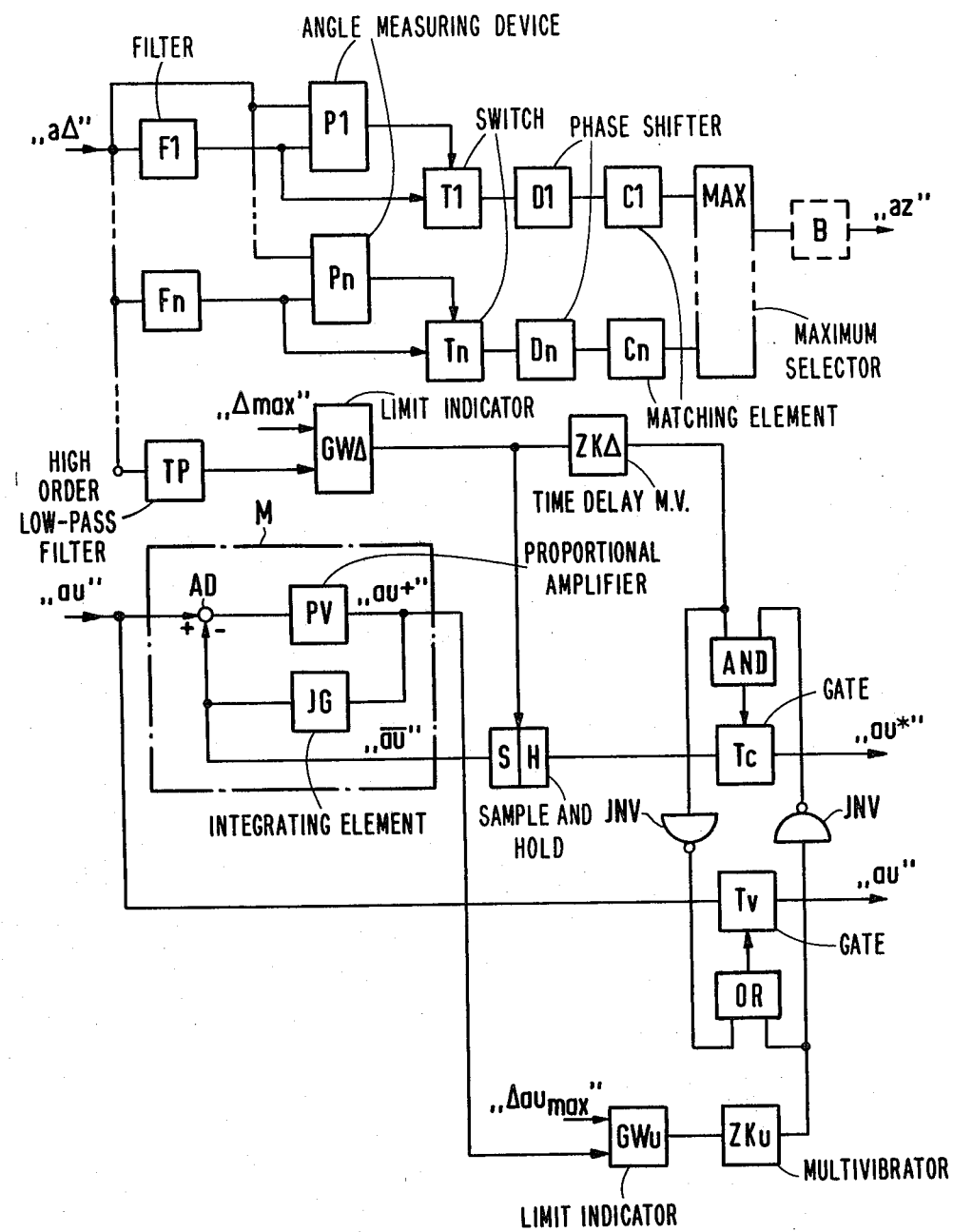

CIRCUIT ARRANGEMENT FOR DAMPING POWER OSCILLATIONS OF SYNCHRONOUS GENERATORS IN NETWORKS

BACKGROUND OF THE INVENTION

This invention relates to synchronous generators in general and more particularly to a circuit arrangement for damping power oscillations of synchronous generators in networks.

Circuit arrangements for the damping of power oscillations of synchronous generators in networks, using signals derived from power changes and sent to the exciter arrangement of at least one synchronous machine, are designed so that, for a certain limited frequency range, they form a damping signal, derived from power variations in the network which influences the voltage regulator in the sense of eliminating the effects of the power variations. When filters are used, in the chosen range, the damping signal has an optimum phase only for one oscillation frequency, so that, for a range of oscillation frequencies, as is required for operation with optimum phase over the entire range, a correspondingly large number of differently rated filters must be provided which, however, may influence each other in an undesirable manner.

It is the object of the present invention to avoid such a mutual influence of the individual filters and to prevent changes in the reactive power of the synchronous machine which are too great for a low frequency range and especially critical in view of the oscillations.

SUMMARY OF THE INVENTION

In accordance with the present invention, to solve this problem the input signal corresponding to the respective frequency or power variation is supplied both to the inputs of the discrete filters and to angle measuring devices assigned to them. Only the tuned filter, in conjunction with its angle measuring device, actuates a switch which sends the filter output via angle rotating and matching elements to a MAX selector element, from which the supplementary damping signal for the excitation is tapped. For low oscillation frequencies a low-pass filter is provided which via mean value formers and time delay multivibrator stages, permits a regulator signal to become operative for the excitation, delayed or undelayed, when certain limit values are exceeded.

BRIEF DESCRIPTION OF THE DRAWING

The single FIGURE is a circuit diagram of an embodiment of the present invention.

DETAILED DESCRIPTION

The signal $a\Delta$, characteristic for the occurring oscillation and corresponding to a certain power and/or frequency variation $\Delta P$ or $\Delta f$, is supplied simultaneously to the differently tuned descrete filters F1 to Fn, with only the filter tuned to the signal $a\Delta$ just then present having an optimum output quantity characterized by a minimum phase angle phi between input and output. The filter output quantities are supplied to respective electronic switches T1 to Tn in the form of analog gate circuits. Each switch or gate T1 to Tn is separately closed or enabled in dependence on the output of associated angle measuring devices P1 to Pn. The devices P1 to Pn have as inputs both the signal $a\Delta$ and the optimum output quantity of the respective tuned filter. An output quantity reaches a respective switch and closes it only if $\Delta phi$ is equal to or less than epsilon. When a switch is closed, the output signal of the optimally tuned filter is sent via one of the associated phase shifters D1 to Dn and one of the subsequently connected quantity determining matching elements C1 to Cn, to a maximum selector MAX common to all partial filter circuits. The maximum selector MAX has an additional input signal for the controller, not shown, of a synchronous generator feeding the network. It is the function of the phase shifters and of the matching elements to transform the output signals of the individual filters into signals of a defined phase and amplitude relative to the signal $a\Delta$. The respective other filters, not tuned to the signal $a\Delta$ just then present, deliver only a smaller output quantity at $\Delta phi$ approximately equal to epsilon, if they do so at all, owing to which the associated angle measuring devices are not caused to deliver an enabling command for the switches T1 to Tn associated with them.

With decreasing oscillation frequencies, a subdivision into ever smaller frequency ranges must be made to obtain an optimum phase, since otherwise undesirably large reactive power changes could occur. This fine subdivision, however, requires a plurality of appropriately tuned discrete filters.

To substantially reduce the filter cost for the low oscillation frequencies from about 0.3 Hz on, it is advantageous, in consideration of the natural damping of such synchronous generators when voltage control has failed, to utilize the relatively great voltage fluctuations occurring in this oscillation frequency range to maintain the output of the voltage regulator at a continuously formed mean for a certain time. The very great changes of the generator voltage that may occur during this time due to the inoperative voltage regulators, e.g. upon short circuit or load dumping, null the switching from controlled to uncontrolled generator operation for a sufficiently long period to maintain the stability or respectively to reduce the occurring voltage increase. To this end, the signal $a\Delta$ is also sent to a higher order low-pass filter TP with a limit frequency of 0.3 Hz, whose output is connected to one input of a limit indicator GW$\Delta$. The other input of the limit indicator is energized with the variation amplitude $\Delta max$. The output of the limit indicator GW$\Delta$ is connected to a time delay multivibrator stage ZK$\Delta$ and to a sample and hold circuit SH.

When the output quantity of the low-pass filter TP supplied to the limit indicator GW$\Delta$ exceeds the variation amplitude $\Delta max$, the limit indicator responds and drives the time delay multivibrator stage ZK$\Delta$ as well as the sample and hold circuit SH in such a way that the output "au" (retained by means of an ordinary mean value forming circuit M with a relatively long integration time) of the voltage regulator (not shown) of the synchronous generator is transformed, in a gate circuit Tc, into a mean quantity "au*" for action on the exciter arrangement (not shown) of the synchronous generator. The mean value forming circuit M, which comprises a proportional amplifier PV and an integrating element IG, also contains an addition stage, i.e., a summing junction, AD connecting the two aforesaid parts.

The output mean "$\overline{au}$" of the mean value former M is coupled through the actuated sample and hold circuit SH to the actuated gate circuit TC, during the period determined by the time delay multivibrator stage ZK$\Delta$, provided the And conditions for the AND element are fulfilled, so that the mean quantity "au*" is present at the output of the gate circuit Tc.

When the variable quantity "au+" occurring at the output of the proportional amplifier PV becomes greater than a maximum quantity "$\Delta au_{max}$", both of which quantities are supplied to the separate inputs of a second limit indicator GWu, the limit indicator GWu responds and actuates a second gate circuit Tv during the period of a time delay multivibrator stage ZKu triggered by the output of limit indicator GWu via an OR element, coupling the original controller signal "au" through gate Tv so it alone can become operative for the exciter arrangement. For interaction of the two gate circuits Tv and Tc, the inputs of the AND element and of the OR element are coupled via inverting circuit elements INV, so that only one of the two gate circuits can be actuated for current conduction.

Switching back from gate circuit Tc to gate circuit Tv occurs after the time delay caused by the multivibrator stage ZKΔ. In the case of a short circuit or load dumping with large signal changes of the voltage regulator, the switching is effected by the limit value stage GWu via the time delay multivibrator stage ZKu thereof for a certain shorter time until "au" drops below the limit value "$\Delta au_{max}$".

What is claimed is:

1. In a circuit arrangement for damping power oscillations of synchronous generators in networks, where discrete filters tuned for the individual oscillator frequency ranges are provided, the output quantities of which are used as supplementary damping signals for regulating the synchronous generators, the improvement comprising:
   (a) a plurality of angle measuring devices, one for each filter each angle measuring device having a first input and a second input;
   (b) means supplying the respective input signal of the circuit arrangement, corresponding to the frequency or power variation both to the inputs of the individual filters and to the first inputs of angle measuring devices assigned to the latter;
   (c) a switching element for each filter;
   (d) means connecting the outputs of the filters to the second inputs of the associated angle measuring devices and to said switching elements;
   (e) means coupling the outputs of said angle measuring devices to said switches to bring them into circuit dependence on said angle measuring devices;
   (f) a common maximum selector element for delivery of a damping signal to the control device of the synchronous generator;
   (g) a phase shifter for each filter; and
   (h) a matching element for each filter, the outputs of the respective filter elements coupled through an associated phase shifter and matching element to said common maximum selector.

2. The improvement according to claim 1 for critical low oscillation frequency range, and further comprising:
   a high order low pass filter tuned to said oscillation frequency range, energized by said input signals of the circuit arrangement;
   a first limit indicator; a first time-delay multivibrator;
   a sample and hold circuit, both said sample and hold circuit and first time-delay multivibrator actuated by an output from said first limit indicator;
   a mean-value former having as an input a first regulator signal, and having a first delayed output coupled as an input to said sample and hold circuit;
   a first switching circuit having as an input the output of said sample and hold circuit, and providing as its output a second regulator signal;
   an AND gate receiving an input from said time-delay multivibrator coupled to control said first switching circuit;
   a second switching circuit having as an input said first regulator signal;
   a second limit indicator having as an input a second varying output from said mean-value former;
   a second time-delay multivibrator stage controlled by the output of said second limit indicator;
   an OR gate receiving an input from said second time-delay multivibrator and providing a control input to said second switching circuit; and
   inverting circuits interconnecting said AND and OR gates for mutual switching.

* * * * *